United States Patent
Lin et al.

(10) Patent No.: US 7,682,409 B2
(45) Date of Patent: Mar. 23, 2010

(54) WAVE-SHAPED CHARGE COLLECTION PLATE OF FUEL CELLS AND METHOD OF MAKING THE SAME

(75) Inventors: Yu-Chih Lin, Kao-Hsiung (TW); Jiun-Ming Chen, Taipei County (TW); Chiang-Wen Lai, Taipei (TW); Ching-Sen Yang, Taoyuan County (TW); Su-Yun Yu, Tao-Yuan (TW)

(73) Assignee: Nan Ya Printed Circuit Board Corporation, Luchu, Taoyuan (TW)

( * ) Notice: Subject to any disclaimer, the term of this patent is extended or adjusted under 35 U.S.C. 154(b) by 841 days.

(21) Appl. No.: 11/538,064

(22) Filed: Oct. 3, 2006

(65) Prior Publication Data

US 2008/0026137 A1    Jan. 31, 2008

(30) Foreign Application Priority Data

Jul. 26, 2006    (TW) .............................. 95127291 A

(51) Int. Cl.
*H01M 4/82* (2006.01)
*H01M 2/00* (2006.01)
*B21K 27/06* (2006.01)

(52) U.S. Cl. .................... 29/623.1; 427/115; 72/324; 429/34

(58) Field of Classification Search ................... 429/34; 29/623.1; 427/115; 72/324
See application file for complete search history.

(56) References Cited

U.S. PATENT DOCUMENTS

| 3,832,176 | A | * | 8/1974 | Verstraete et al. | 430/276.1 |
| 5,468,573 | A | * | 11/1995 | Bregoli et al. | 429/16 |
| 6,383,677 | B1 | * | 5/2002 | Allen | 429/34 |
| 6,716,549 | B2 | * | 4/2004 | Bai et al. | 429/34 |
| 7,229,564 | B2 | | 6/2007 | Liu et al. | |
| 2007/0134542 | A1 | | 6/2007 | Chang et al. | |

FOREIGN PATENT DOCUMENTS

| TW | I241048 | 10/2005 |
| TW | M291089 | 5/2006 |

* cited by examiner

*Primary Examiner*—Patrick Ryan
*Assistant Examiner*—Thomas H. Parsons
(74) *Attorney, Agent, or Firm*—Winston Hsu

(57) ABSTRACT

A flow board suited for fuel cell applications. The flow board includes a body substrate formed by injection molding methods, which is resistive to methanol or chemical corrosion and has superior mechanical properties. The flow board further includes a wave-shaped reaction zone having thereon a plurality of independent fuel channels. The body substrate and the wave-shaped reaction zone may be monolithic. Alternatively, a punched electrode plate affixed on the reaction zone may define the plurality of independent fuel channels.

5 Claims, 13 Drawing Sheets

WAVE-SHAPED CHARGE COLLECTION PLATE OF FUEL CELLS AND METHOD OF MAKING THE SAME

BACKGROUND OF THE INVENTION

1. Field of the Invention

The present invention relates to a method of manufacturing a current collector of a flow board of a fuel cell. The flow board has high methanol resistance, high mechanical strength, superior fuel flow efficiency, and low cost.

2. Description of the Prior Art

A fuel cell is an electrochemical cell in which a free energy change resulting from a fuel oxidation reaction is converted into electrical energy. Fuel cells utilizing methanol as fuel are typically named as Direct Methanol Fuel cells (DMFCs), which generate electricity by combining gaseous or aqueous methanol with air. DMFC technology has become widely accepted as a viable fuel cell technology that offers itself to many application fields such as electronic apparatuses, vehicles, military equipments, aerospace industry and so on.

DMFCs, like ordinary batteries, provide dc electricity from two electrochemical reactions. These reactions occur at electrodes (or poles) to which reactants are continuously fed. The negative electrode (anode) is maintained by supplying methanol, whereas the positive electrode (cathode) is maintained by the supply of air. When providing current, methanol is electrochemically oxidized at the anode electrocatalyst to produce electrons, which travel through the external circuit to the cathode electrocatalyst where they are consumed together with oxygen in a reduction reaction. The circuit is maintained within the cell by the conduction of protons in the electrolyte. One molecule of methanol ($CH_3OH$) and one molecule of water ($H_2O$) together store six atoms of hydrogen. When fed as a mixture into a DMFC, they react to generate one molecule of $CO_2$, 6 protons ($H+$), and 6 electrons to generate a flow of electric current. The protons and electrons generated by methanol and water react with oxygen to generate water. The methanol-water mixture provides an easy means of storing and transporting hydrogen, much better than storing liquid or gaseous hydrogen in storage tanks.

The DMFC module usually includes a current collector (or also referred to as charge collector board) and a flow board, which both play important roles. The current collector collects the electrons generated from the electron-chemical reaction, and the flow board manages and controls the distribution of the fuel. In the past, the flow board design has focused on enabling fuel to pass smoothly through the fuel channel into the membrane electrode assembly (MEA).

The prior flow boards use graphite or glass fiberboard such as FR4, FR5 as the materials of the body substrates. Conventionally, the flow board is made using a computer numerical control (CNC) mill lathe. The shortcomings of CNC mill lathe include low yield and high cost. The prior body substrates, which are made of graphite, FR4, or FR5, have poor mechanical properties, and occupy too much space. The above reasons are disadvantageous for the yield and popularization of the fuel cell.

To apply the fuel cell in the laptops, cellular phones or PDA, reduction both in cost and cell volume are required. Hitherto, there are still challenges in developing relevant elements of fuel cells. There is a strong need in this industry to combine these relevant elements with fuel cell mechanism at design phase thereby obtaining breakthrough in aspects of lighter, thinner, smaller fuel cell devices or modules, which are more practicable.

In conclusion, a well designed flow board does not only depend on choosing a material that is resistive to corrosion caused by gaseous/liquid fuel and/or the chemical reactant, but also requires choosing a material that has superior mechanical properties, low cost, and fast mass production. There is a need to improve both the materials and the manufacturing methods utilized in conventional flow boards.

SUMMARY OF THE INVENTION

In view of the above reasons, the main purpose of the present invention is providing an improved method of manufacturing a current collector that can be integrated with a flow board of a fuel cell in order to improve the shortcoming of the prior art.

According to the claimed invention, a method of manufacturing a wave-shaped current collector of a fuel cell is provided. An anti-corrosion and anti-oxidation charge-collecting layer is prepared. A first side of the charge-collecting layer is covered with a masking layer. A conductive layer is then plated on a second side of the charge-collecting layer. A photosensitive dry film is formed on the conductive layer, wherein the photosensitive dry film defines a pattern of the current collector. The conductive layer that is not covered with the photosensitive dry film is then etched away. The photosensitive dry film and the masking layer are removed. A protection film is adhered on the second side of the charge-collecting layer to isolate the conductive layer. A cutting process is then performed to form a current collector. The current collector is stamped to form a wave-shaped current collector, thereby defining a plurality of flow channels thereon.

The charge-collecting layer comprises stainless steel, carbon, graphite, gold, platinum, silver, aluminum, chrome, titanium, cadmium or metal oxides thereof. The conductive layer comprises copper, metal oxides, metal alloys, gold, platinum, silver, carbon or graphite. The dry film comprises photoresist. The protection film comprises electro-coating paints, stainless steel, aluminum, chrome, titanium, cadmium, metal oxides thereof, alloys thereof, polymeric materials, siloxane and ceramic materials.

These and other objectives of the present invention will no doubt become obvious to those of ordinary skill in the art after reading the following detailed description of the preferred embodiment that is illustrated in the various figures and drawings.

DETAILED DESCRIPTION

As previously mentioned, the conventional current collector utilizing gold foil is expensive. The present invention provides a novel mechanism and method to integrate current collector with flow board. A fuel cell module is formed by laminating parts including the integrated current collector and flow board, thereby reducing its volume and cost and is thus applicable to 3C products.

The present invention pertains to a flow board of a fuel cell utilizing gaseous or liquid fuel. The flow board has one or more than one reaction zones. The methanol fuel flows and reacts to generate electric current after the membrane electrode assembly (MEA) is laminated on and affixed to the flow board.

The flow board of the fuel cell in the present invention is an equipment reacted hydrogen or hydrogen compound with a catalyst, and the chemical energy changes to electric power. The flow board of the present invention is provided for the proton exchange membrane fuel cell used in portable electric products. It needs to be light, thin, and small, and to resist the chemical corrosion of the gaseous/liquid fuel and its reactant, and has superior mechanical properties.

Figure 1:
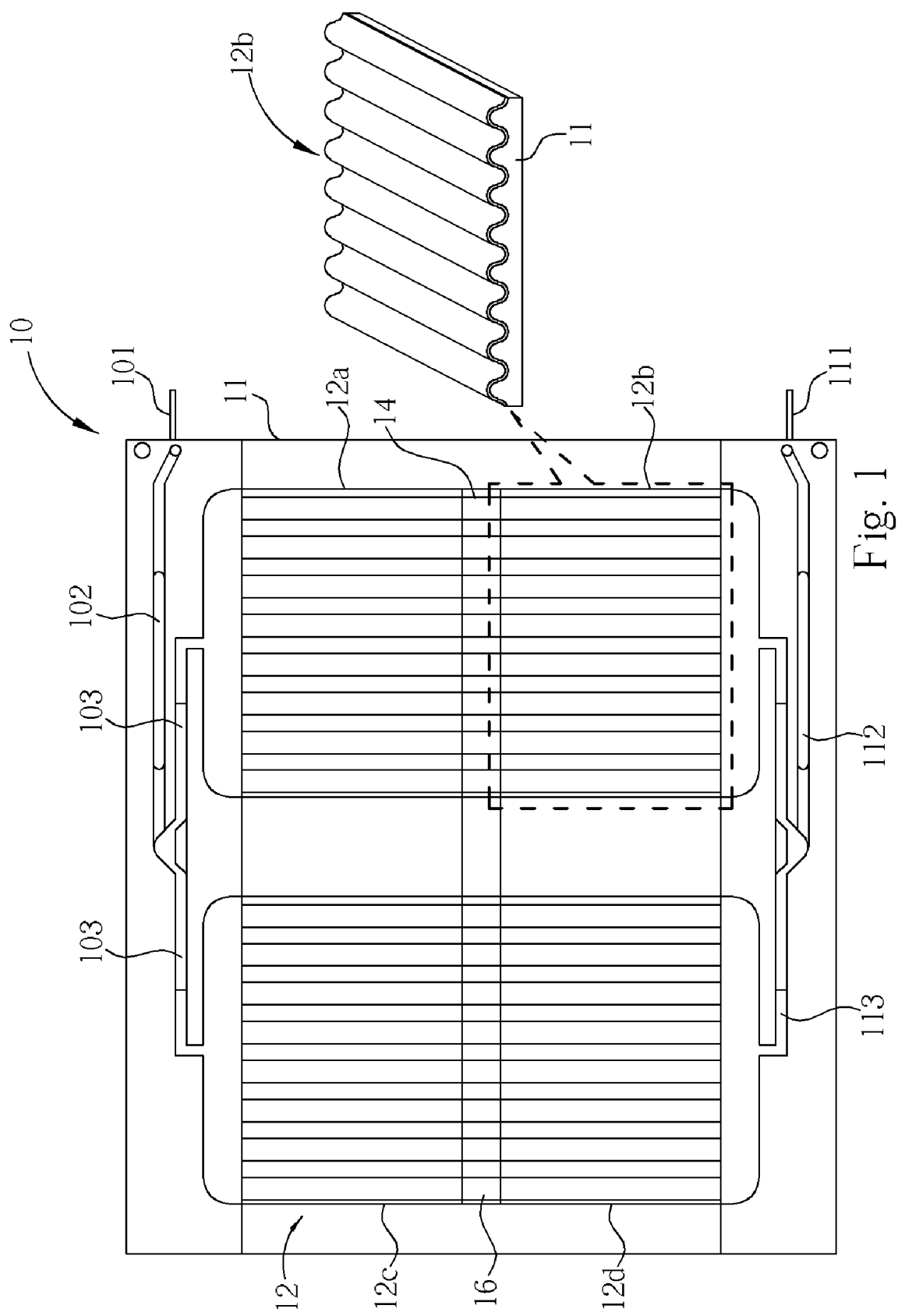
FIG. 1 illustrates a top view schematic diagram of a flow board according to the preferred embodiment of the present invention.

Please refer to FIG. 1, which illustrates a top view schematic diagram of a flow board according to the embodiment of the present invention. As FIG. 1 shows, the flow board 10 of the present invention includes a body substrate 11, and at least a wave-shaped reaction zone 12. Take four wave-shaped reaction zones 12a, 12b, 12c, and 12d in FIG. 1 as an example. The lateral view of reaction zone 12b is the right diagram in FIG. 1. The fuel channels of reaction zones 12a, 12b, 12c, and 12d have the same flowing direction, from top to bottom or from bottom to top. The fuel channels of the reaction zones 12a and 12b interflow with each other. The fuel channels of the reaction zones 12c and 12d also interflow with each other. A crossing zone 14 is between the reaction zones 12a and 12b. A crossing zone 16 is between the reaction zones 12c and 12d.

The present invention does not limit one surface of the body substrate 11 to have the wave-shaped reaction zone. The other surface of the body substrate 11 could have the same wave-shaped reaction zone. Therefore, the present invention can apply to fuel channels on a single surface, or fuel channels on double surfaces.

As FIG. 1 shows, the body substrate 11 has a fuel inlet 101, input fuel channel 102, and manifold 103 at one end for injecting fuel. The fuel, such as methanol, flows into independent fuel channels of the reaction zone 12a, and 12c through the fuel inlet 101, input fuel channel 102, and manifold 103, and then flows into the reaction zones 12a and 12c, which are connected with the reaction zones 12b and 12d, respectively. Finally, the fuel flows out through the output fuel channels 112, and 113, and a fuel outlet 111.

One kernel feature of the present invention is that the fuel channels of reaction zones 12a, 12b, 12c, and 12d have the same flowing direction, e.g. from top to bottom or from bottom to top. The reaction zones 12a and 12b connect with each other, and the reaction zones 12c and 12d connect with each other. Each fuel channel of the reaction zones 12a, 12b, 12c, and 12d is independent from others to provide smooth and uniform flow.

According to the preferred embodiment of the present invention, the body substrate 11 of the flow board is made by injection molding methods with injection moldable polymer materials, which are able to be molded utilizing said injection molding methods, such as polyetheretherketone (PEEK), polyetherketoneketone (PEKK), Polysulfone (PSU), liquid crystal polymer (LCP), polymer plastic substrate or a compound of engineering plastic.

It is noteworthy that not every injection moldable polymer materials that can be molded by injection molding method can form the body substrate 11 of the flow board in the present invention. Take ABS resin, PP resin, and polycarbonate (PC) for example. These substances can be molded by injection molding methods, but they cannot resist methanol and do not have superior mechanical properties, so they are unsuitable. Therefore, the suitable materials are those listed in the above paragraph, with PSU being particularly suitable.

The above-mentioned injection moldable polymer materials could be further injected concurrently with filler. The above-mentioned filler could be a modifier, floating agent, mold-release agent etc.

The embodiment of forming the flow board of the present invention is illustrated by the following example (the material of the flow board is PSU in the example).

The injection molding method of forming the flow board of the present invention includes three basic steps: melting, floating, and solidifying. The powder PSU is melted to a liquid state by heating. Then, the melted PSU is injected into the mold, and cools down to become solid. The whole process is fast and automatic, and is especially suitable for mass production.

(1) Melting: the powder PSU is deformed under heat and pressure.

(2) Floating: the deformed PSU is filled in the whole mold under pressure.

(3) Solidifying/cooling: Once the PSU is cooled down it will be taken out.

Figure 2:
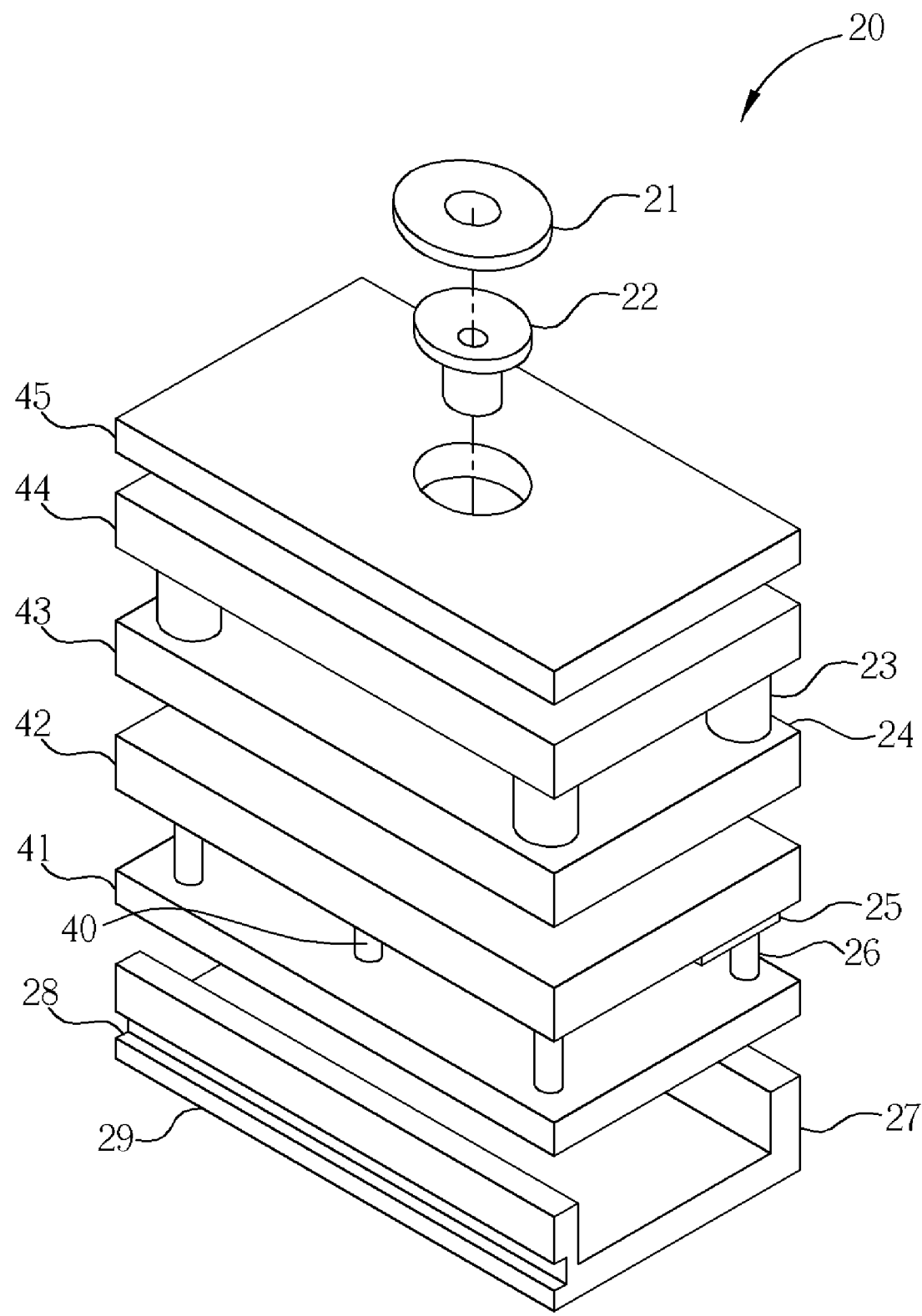
FIG. 2 illustrates a decomposed schematic diagram of the mold of the present invention.

FIG. 2 illustrates a decomposed schematic diagram of the mold 20 of the present invention. The mold 20 of the present invention includes a positioning ring 21, an injection brushing 22, guide pins 23, a membrane 24, an ejection plate 25, an ejection pin 26, a C stick 27, a groove 28, an ejection cover 29, an injection injector 40, an injection fixed plate 41, a support plate 42, a B board 43, an A board 44, and a top plate 45. Please note that the present invention is not limited to the above-mentioned mold.

The wave-shaped reaction zone 12 of the present invention and the body substrate 11 could be made monolithic at the same time. Furthermore, the wave-shaped reaction zone 12 could also be made in other ways. For example, a current collector plate defines fuel channels. The current collector plate is then combined with the body substrate 11 that is made by the injection molding methods.

Figure 3:
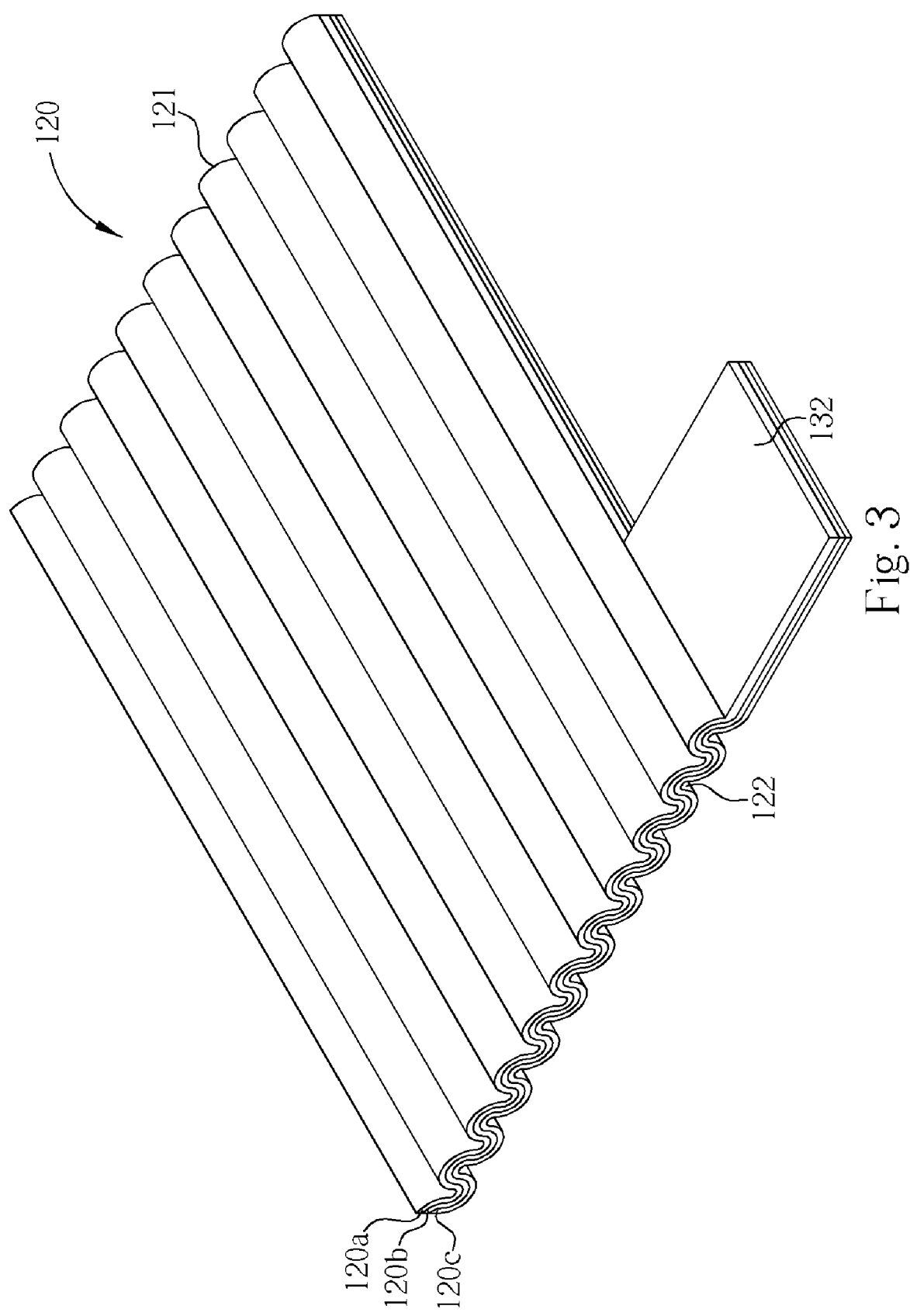
FIG. 3 illustrates a schematic diagram of a current collector, which defines wave-shaped fuel channels according to another embodiment of the present invention.

Please refer to FIG. 3, which illustrates a schematic diagram of a current collector 120, which is defined as a wave-shaped fuel channel according to another preferred embodiment of the present invention. In the embodiment, the current collector (anode) 120 is made from stainless steel or metal materials that are able to resist chemical corrosion from gaseous/liquid fuel of the fuel cell, such as the thin substrate 120a made by SUS316, SUS316L, SUS304, SUS304L, and titanium (Ti) alloy, and are made by a stamping process to form the wave-shaped fuel channels.

As shown in FIG. 3, the front surface 121 of the current collector 120 is formed by a plurality of independent wave-shaped fuel channels utilizing the stamping process for ensuring that the gaseous/liquid fuel flows smoothly. If the substrate 120a is made from stainless steel, which has higher resistance, the back 122 of the current collector 120 could be plated with a copper layer 120b to decrease electrical resistance. A polymer film 120c can cover and isolate the copper film 120b from contacting with the gaseous/liquid fuel of the fuel cell. By doing this, the copper does not separate out or diffuse out to poison the fuel cell. The current collector 120 further includes a projective, bendable conductive lug portion 132. This connects electrically with the current collector 120 and the circuit of the cathode conductive plate, and allows electron output.

Figure 4:
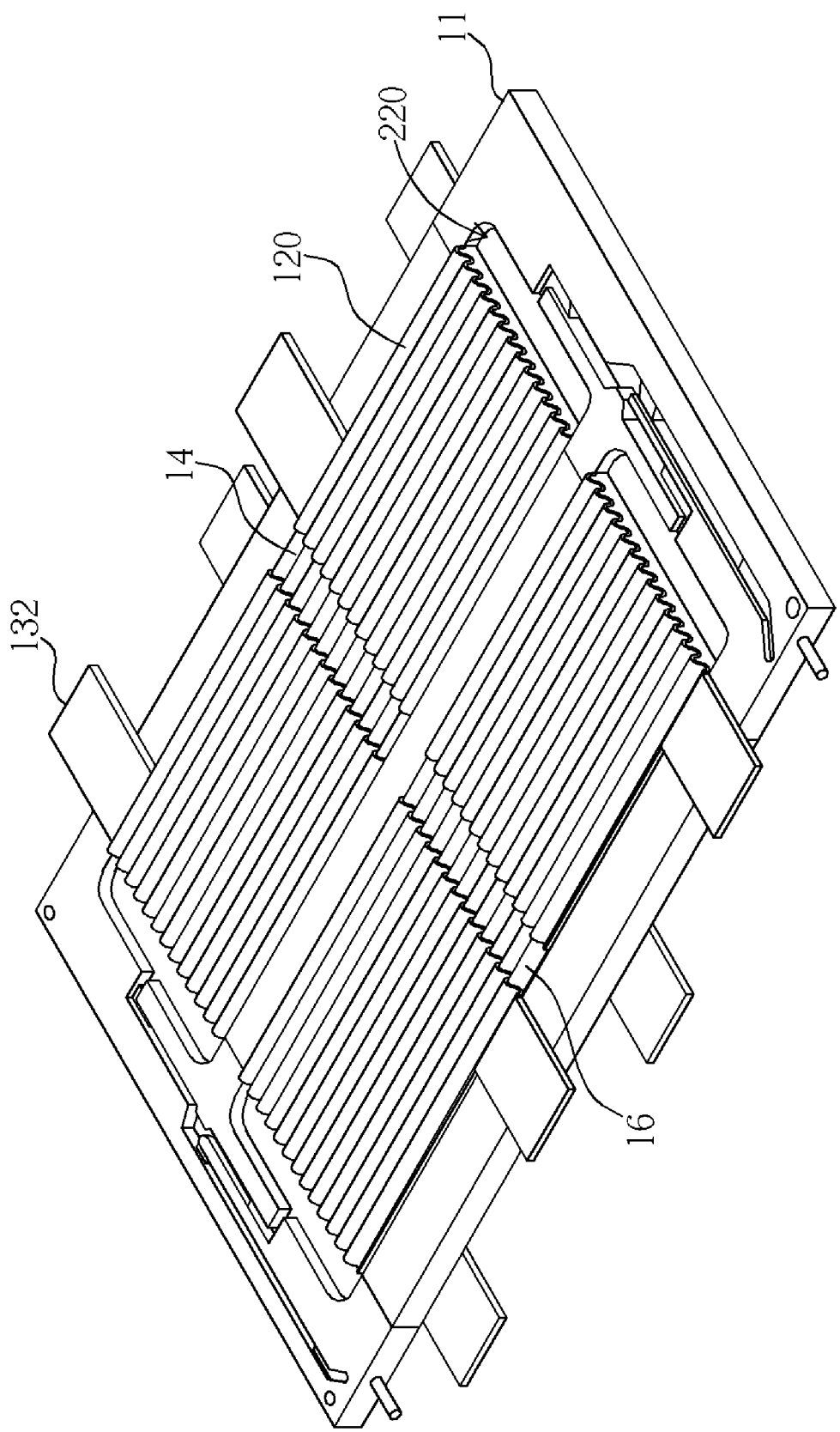
FIG. 4 illustrates a schematic diagram of the current collector of FIG. 3 that is mounted on a body substrate.

The current collector 120 of FIG. 3 is affixed to the body substrate 11 made by injection molding methods as shown in FIG. 4. The current collector 120 may be adhered to the body substrate 11 by using epoxy glue or other types of epoxy resins. The current collector 120 could also be jammed or wedged into the body substrate 11 or fixed by screws. The wave-shaped current collector may be mounted on the reaction zone by pressing-adhesive method, pressing-wedging method or pressing-snapping method. The current collector 120 is deposited in a corresponding recessed zone 220 provided by the body substrate 11. The shapes of the recessed zone and the current collector 120 are matched in order to save space.

In the direction of fuel channels, the crossing zones 14, and 16 are between the two adjacent current collectors 120. The fuel channels on the crossing zones 14, and 16 are monolithic with the body substrate 11, and connect with the corresponding fuel channels of the current collector 120. The conductive lug portion 132 is bended to connect electrically with the circuit of a cathode conductive plate (not shown). The conductive lug portion 132 can be connected in series or in parallel with the battery cells.

The current collector integrated on the body substrate 11 has at least the following advantages. First, the current collector could be made from stainless steel. Compared with the prior art, which uses gold, the present invention reduces cost. The stainless steel substrate forming the wave-shaped fuel channels by a stamping process is very simple and fast. Furthermore, the current collector 120 formed on the body substrate 11 could decrease the whole thickness of the fuel cell.

According to this invention, the current collector 120 may be formed by pressing and laminating a conductive material film onto a corrosion or acid resistive material film, or by sputtering conductive film onto a corrosion or acid resistive material film.

Practically, when the current collector 120 is in use, the aforesaid conductive material film will contact with MEA embedded in the fuel cell for implementing electron conduction and interactions. During the operation of a fuel cell device, since the anode electrode thereof is usually in an oxidation status, there are basically two restrictions that should be taken into consideration.

(1) Conventional conductive material such as copper is prone to poison or damage MEA of the fuel cell due to copper ion leakage. Besides, the conductance of conventional conductive material such as copper drops because the oxidation interaction occurs at the anode electrode of the fuel cell.

(2) The use of noble metals such as gold and platinum is expensive.

FIGS. 5-13 illustrate a method of manufacturing a current collector of a flow board of a fuel cell according to one preferred embodiment of this invention.

The present invention provides a multi-layer current collector including but not limited to the following layers:

(1) Conductive charge-collecting layer. This layer is formed of corrosion/oxidation resistive conductive material and is in direct contact with the MEA for collecting electrons. According to this invention, the corrosion/oxidation resistive conductive material may be metal alloys, stainless steel materials, carbon, graphite, or the like. Alternatively, the corrosion/oxidation resistive conductive material may be gold, platinum, silver, aluminum, chrome, titanium, cadmium, or metal oxides thereof.

(2) Low-resistance conductive layer. The electrons or charges collected by the conductive charge-collecting layer can be transferred to other components of the fuel cell system, which greatly improves the integral conductance of the current collector. According to this invention, the low-resistance conductive layer may be formed of copper, metal oxides, metal alloys, carbon, graphite, gold, platinum, silver or the like.

(3) Protection layer. This layer is used to mask and protect the low-resistance conductive layer from corrosion. As previously mentioned, under oxidizing and corrosive environment, the low-resistance conductive layer is prone to copper ion leakage that could damage MEA and affect fuel cell performance. According to this invention, the protection layer may be formed of polymer film, stainless steel, aluminum, chrome, titanium, cadmium, metal oxides, metal alloys, polymer, siloxane or ceramic materials.

The aforesaid low-resistance conductive layer may be formed by using electro-plating, electroless plating, sputtering or other suitable chemical or physical deposition methods on the conductive charge-collecting layer.

Alternatively, the conductive charge-collecting layer may be formed by using electro-plating, electroless plating, sputtering or other suitable chemical or physical deposition methods on the aforesaid low-resistance conductive layer.

The fabrication of the aforesaid protection layer may use electro-plating, electroless plating, sputtering, coating, spray coating, printing, pressing or other suitable chemical or physical deposition methods on the low-resistance conductive layer.

Figure 5:
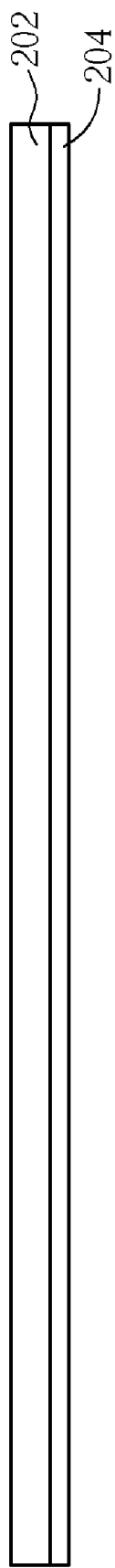
FIGS. 5-13 are schematic, cross-sectional diagrams illustrating a method of manufacturing a current collector of a flow board of a fuel cell according to one preferred embodiment of this invention.

As shown in FIGS. 5-13, an exemplary embodiment is used to explain the details of this invention. In this case, the conductive charge-collecting layer is made of SUS 316L, the low-resistance conductive layer is made of copper, while the protection layer is made of polymer film. The invention includes the following steps:

Step 1: A SUS 316L layer 202 is provided. A masking layer 204 is adhered to one surface of the SUS 316L layer 202, as shown in FIG. 5. The laminate shown in FIG. 5 is subjected to a single-side copper plating process.

Figure 6:
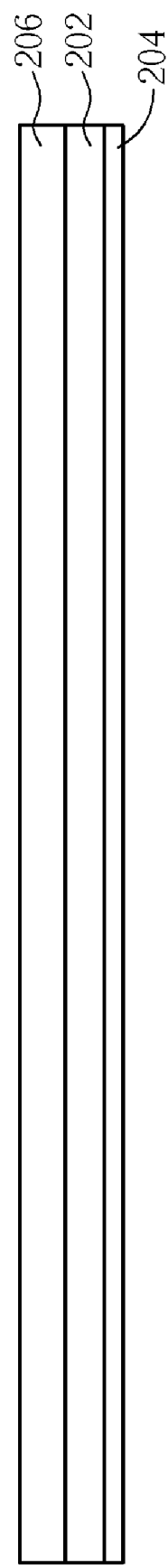

Step 2: A copper layer 206 is plated onto the other side of the SUS 316L layer 202 that is not covered with the masking layer 204, as shown in FIG. 6.

Figure 7:
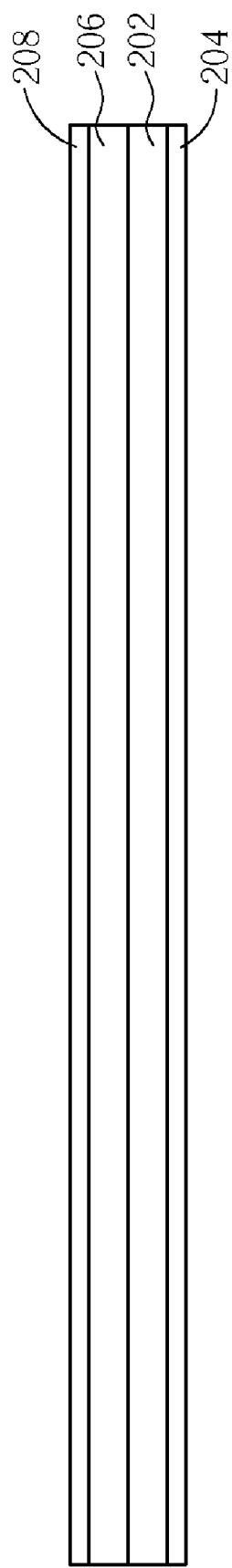
Figure 8:
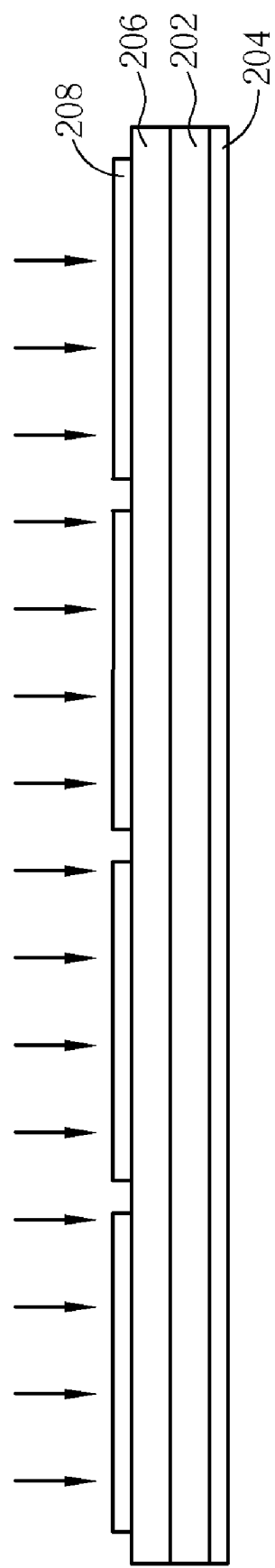

Step 3: A photosensitive dry film 208 or photoresist is adhered or coated onto the copper layer 206, as shown in FIG. 7.

Step 4: A lithographic process including exposure and development is performed to define the pattern of the current collector in the dry film 208, shown in FIG. 8.

Figure 9:
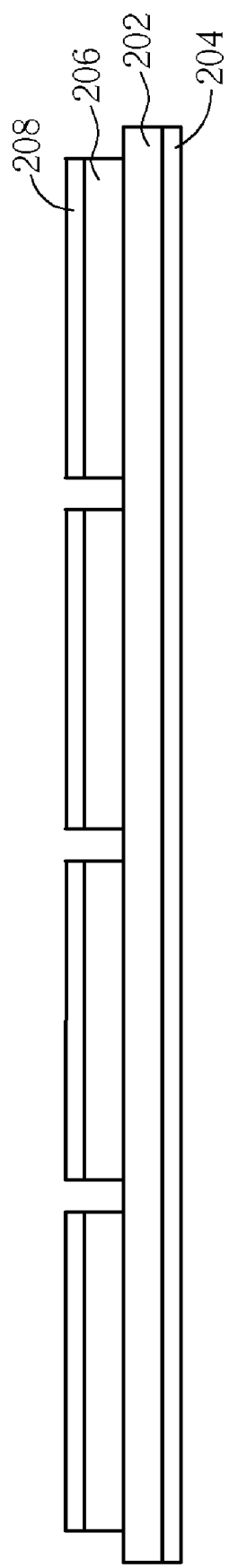

Step 5: The copper layer 206 that is not covered with the remaining dry film 208 is etched away, thereby transferring the pattern in the dry film 208 to the underlying copper layer 206, as shown in FIG. 9.

Figure 10:
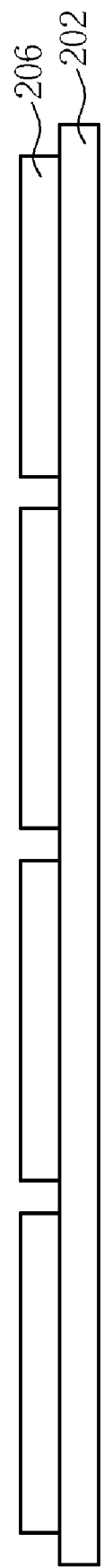

Step 6: The dry film 208 and the masking layer 204 are removed, as shown in FIG. 10.

Figure 11:
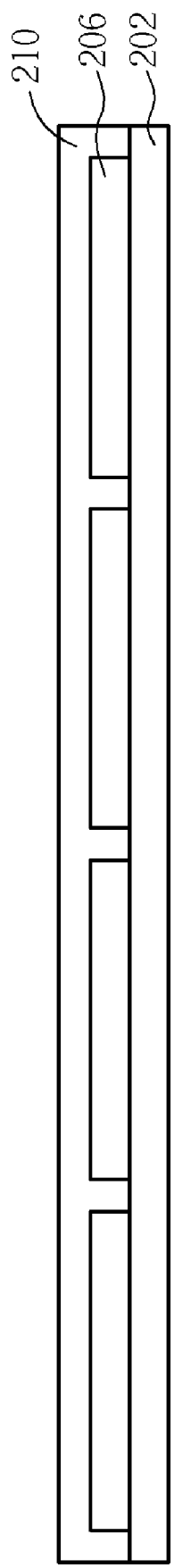

Step 7: A polymer film 210 is adhered onto the patterned copper layer 206 and is used as a protection layer, as shown in FIG. 11.

Figure 12:
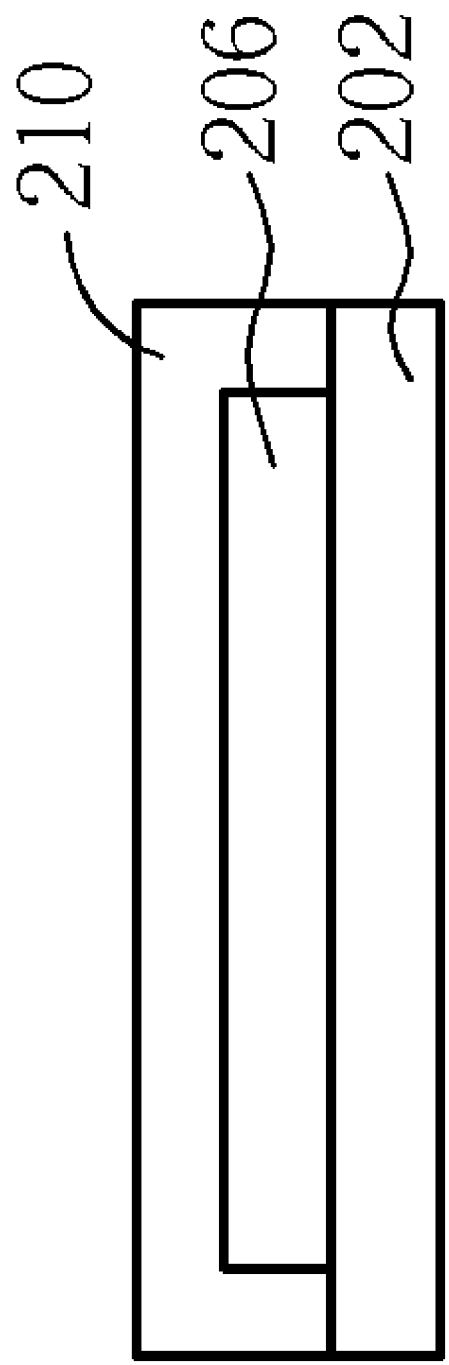

Step 8: A cutting process is performed to form a current collector 120, as shown in FIG. 12, wherein the copper layer 206 is isolated by the polymer film 210.

Figure 13:
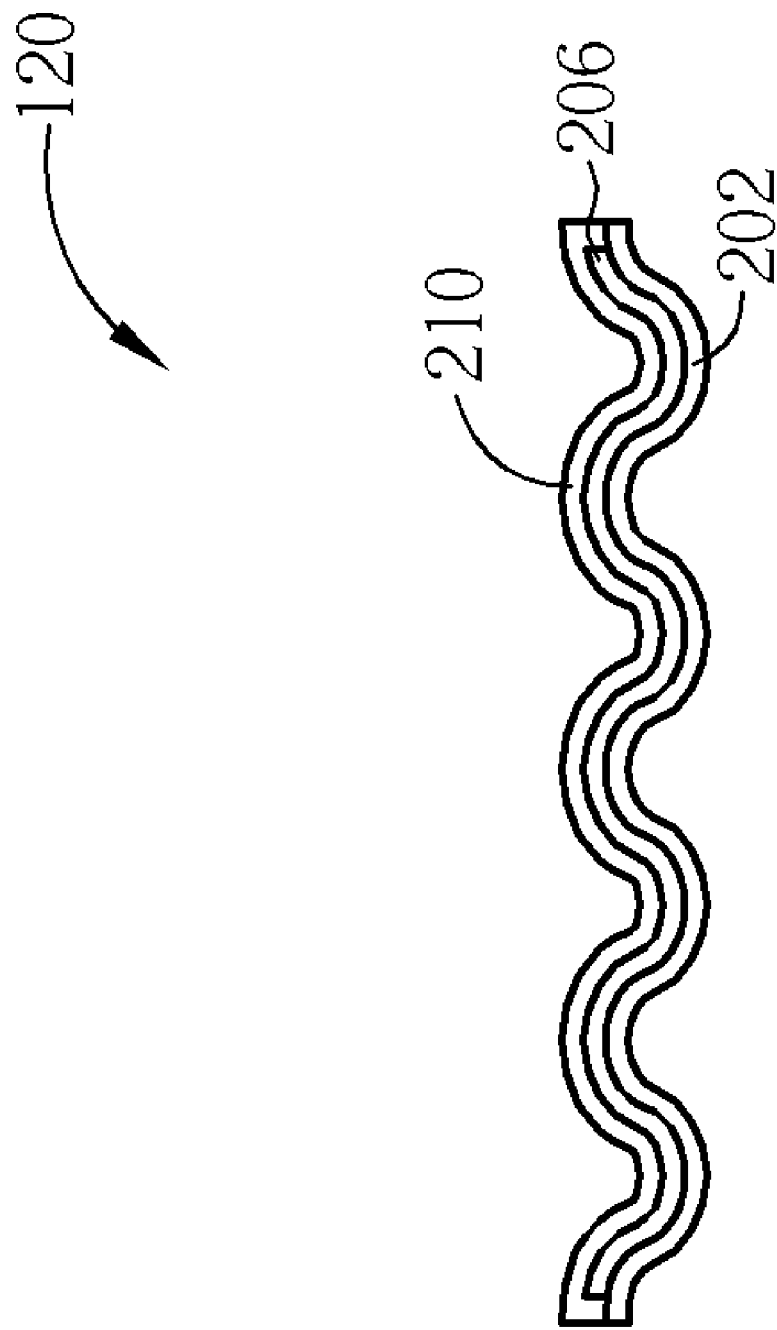

Step 9: The current collector 120 is stamped into wave shape and defines flow channels thereon, as shown in FIG. 13.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method of manufacturing a wave-shaped current collector of a fuel cell, comprising:

providing an anti-corrosion and anti-oxidation charge-collecting layer;

covering a first side of said charge-collecting layer with a masking layer;

plating a conductive layer on a second side of said charge-collecting layer;

forming a photosensitive dry film on said conductive layer, wherein said photosensitive dry film defines a pattern of said current collector;

etching away said conductive layer that is not covered with said photosensitive dry film;

removing said photosensitive dry film and said masking layer;

adhering a protection film on said second side of said charge-collecting layer to isolate said conductive layer;

performing a cutting process to form a current collector; and stamping said current collector to form a wave-shaped current collector, thereby defining a plurality of flow channels thereon.

2. The method of claim 1 wherein said charge-collecting layer comprises stainless steel, carbon, graphite, gold, platinum, silver, aluminum, chrome, titanium, cadmium or metal oxides thereof.

3. The method of claim 1 wherein said conductive layer comprises copper, metal oxides, metal alloys, gold, platinum, silver, carbon or graphite.

4. The method of claim 1 wherein said dry film comprises photoresist.

5. The method of claim 1 wherein said protection film comprises polymer film, stainless steel, aluminum, chrome, titanium, cadmium, metal oxides thereof, alloys thereof, polymeric materials, siloxane and ceramic materials.

* * * * *